Figure 1:
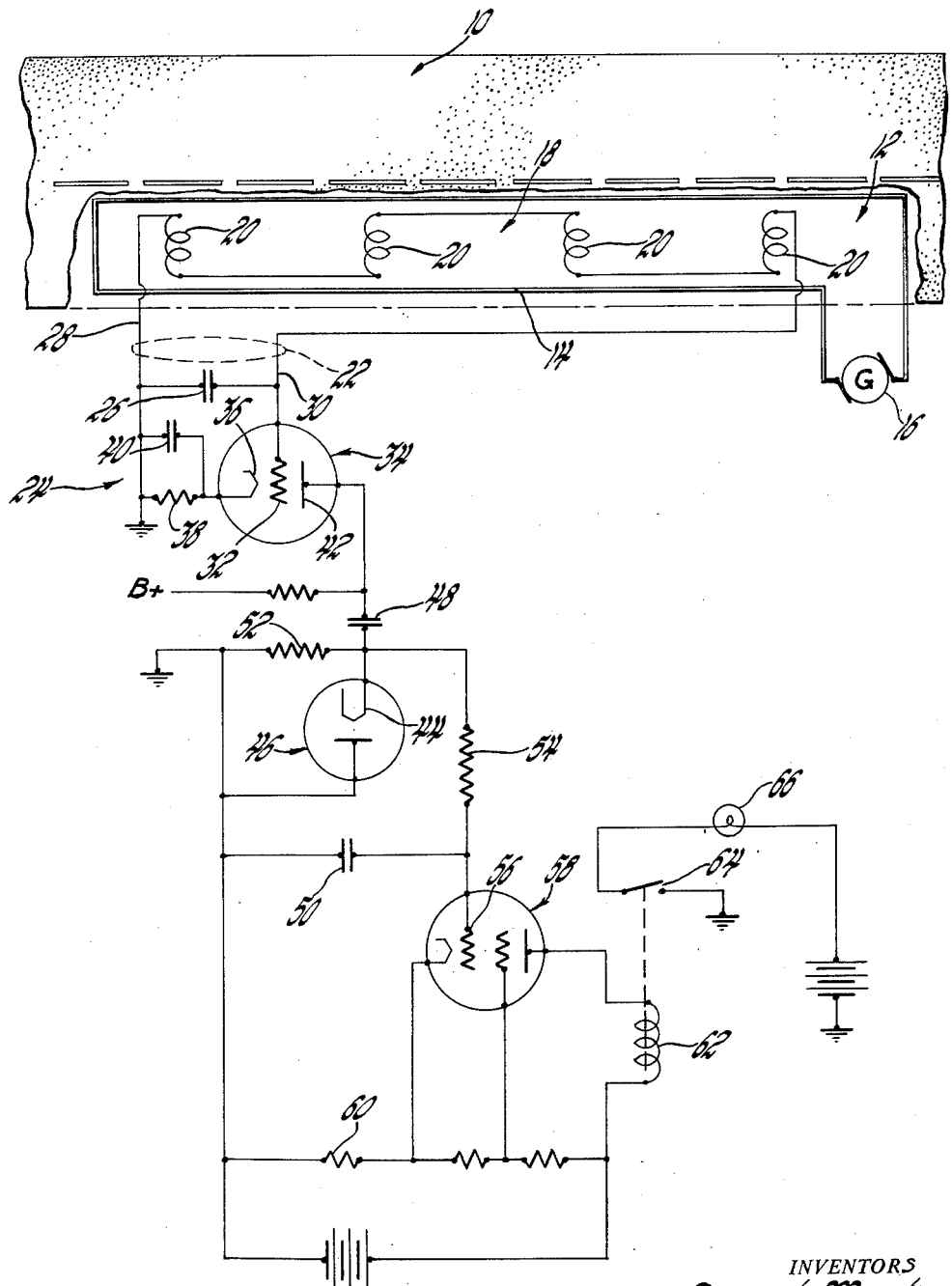

Dec. 11, 1962   G. MOUNTJOY ETAL   3,068,448
OBSTACLE DETECTION SYSTEM
Filed Sept. 8, 1958   2 Sheets-Sheet 1

INVENTORS
Garrard Mountjoy &
BY John D. Reid
D.R. Sadler
ATTORNEY

Dec. 11, 1962 G. MOUNTJOY ETAL 3,068,448
OBSTACLE DETECTION SYSTEM
Filed Sept. 8, 1958 2 Sheets-Sheet 2

INVENTORS
Garrard Mountjoy &
BY John D. Reid
D.A. Sadler
ATTORNEY

3,068,448
Patented Dec. 11, 1962

3,068,448
OBSTACLE DETECTION SYSTEM
Garrard Mountjoy and John D. Reid, Little Rock, Ark., assignors to General Motors Corporation, Detroit, Mich., a corporation of Delaware
Filed Sept. 8, 1958, Ser. No. 759,731
8 Claims. (Cl. 340—38)

The present invention relates to means for automatically controlling automotive vehicles and, more particularly, to means for detecting and indicating the presence of a hazardous condition in the path of the controlled vehicle such as a stationary vehicle, a slowly moving vehicle and/or an overtaking high speed vehicle.

Numerous attempts have been made to devise a practical system for automatically controlling the operation of automotive vehicles to thereby relieve the driver or operator of the necessity of devoting any attention to the operation of the vehicle. The occupants of such a vehicle will normally rely entirely on the control system and will not be concerned with the operation thereof. As a result, they cannot be relied upon to detect and avoid any obstacles such as a stalled or slow moving vehicle in front of the controlled vehicle or high speed vehicles overtaking from the rear.

Accordingly, in order for an automatic system to be acceptable, it must be "foolproof." That is, it must always be capable of detecting the presence of any and all obstacles under all operating conditions. In the past it has been proposed to accomplish this objective by scanning the path of the vehicle with beams of light, sound, radar, infrared, etc. Unfortunately, such systems are expensive and unreliable in operation. In addition, they fail to discriminate with sufficient precision between obstacles that are actually in the path of the vehicle and those which are not.

It is now proposed to provide a system for automatically regulating a vehicle traveling on a roadway which is capable of sensing the presence of any stationary and/or moving obstacles that would be hazardous to the controlled vehicle. More particularly, this is to be accomplished by providing a control cable which is disposed in the roadway along the path which the vehicle is to follow and at least two groups of pickups located sufficiently close to the cable to be subject to the electromagnetic field radiated therefrom and thus be loosely coupled thereto. The pickups in each of the groups are interconnected in such an arrangement that the voltage induced in the pickups will normally be balanced. Thus the total voltage from each group will normally be substantially zero and no output will be produced. However, in the event an obstacle is present in the path of the controlled vehicle, it will affect the degree of coupling between one or more pickups and the cable and thereby affect the total voltage induced in the pickups. In the event a vehicle is traveling over the roadway at the prescribed speed, the period required for the vehicle to travel over the spaces between the pickups will be a predetermined amount. Since such a vehicle will not present an obstacle to another vehicle traveling in the same direction at the command speed, if the frequency of the fluctuations in the output corresponds to this speed, no indications of a hazardous condition will be made. However, in the event the speed of the vehicle is not the prescribed amount, the time periods will be longer or shorter than the desired amount. Since such a vehicle presents a hazardous condition, an indication of the vehicle's incorrect speed will be made. In addition, if a stalled or stationary vehicle is located on the roadway, the coupling of one or more pickups will remain changed for an extended time. Thus an output will be provided from the pickups to indicate the presence of an obstacle.

Figure 2:
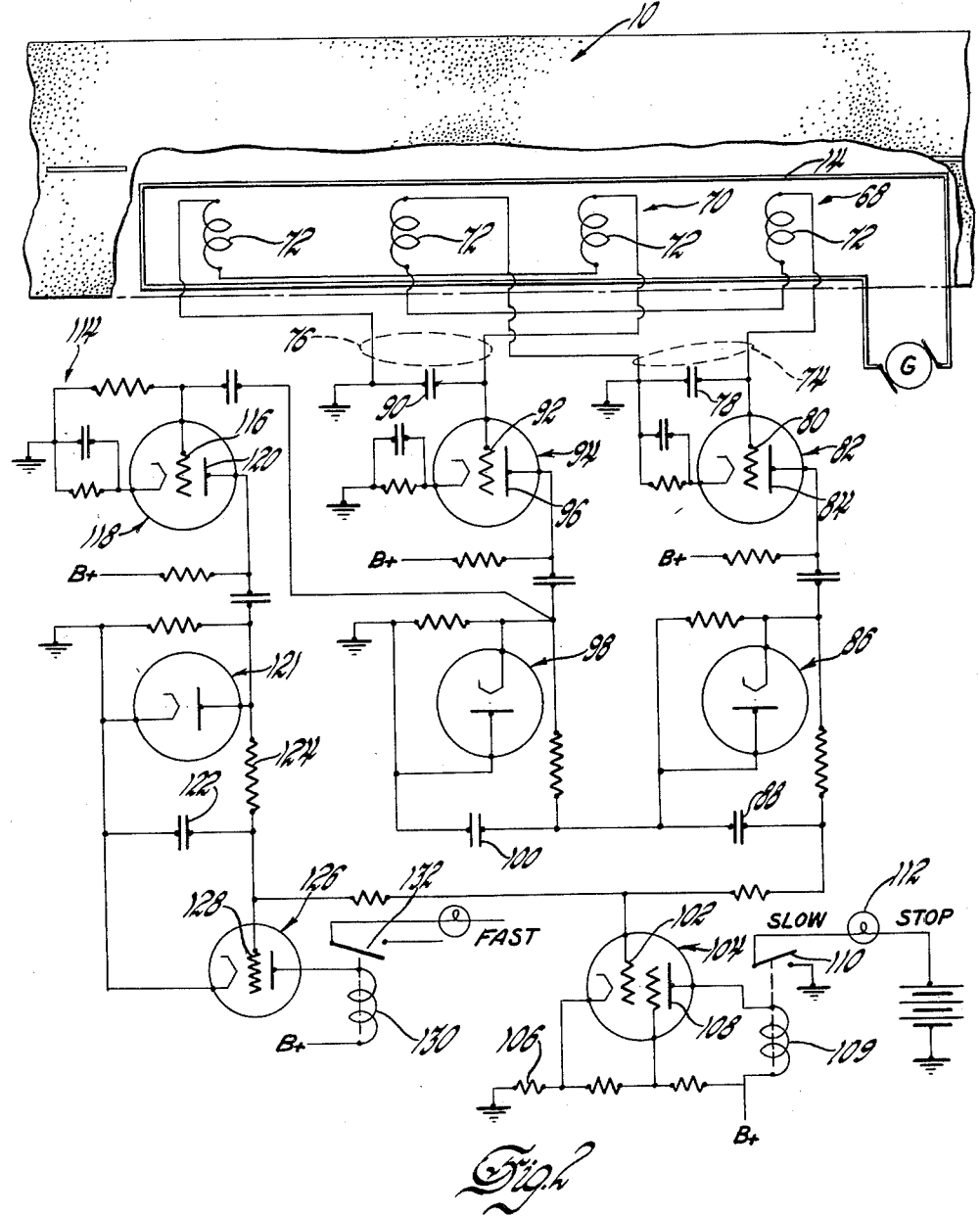

In the drawings:
FIGURE 1 is a schematic representation of an obstacle detection system embodying the present invention.
FIGURE 2 is a schematic representation of another embodiment of the present invention.

The present invention is adapted to be embodied in a system such as disclosed and claimed in United States Patent No. 3,029,893, issued April 17, 1962, and assigned to the assignee of the present invention. For automatically controlling a vehicle. In this system the roadway 10 is divided into sections or blocks 12 and each section 12 includes a control cable 14 buried beneath the surface of the roadway 10 and provided with an alternating current by a generator 16 that causes an alternating electromagnetic field to be radiated above the surface of the roadway 10 to form a guidance signal for defining the path the vehicle is to follow. Any vehicles that are to be automatically controlled are equipped with one or more inductive pickups that are adapted to travel through the electromagnetic field and to develop an error signal indicative of the position of the vehicle relative to the cable 14. The error signal is then utilized to actuate a power steering system for automatically directing the vehicle along the path defined by the cable 14. Although the frequency of the current in the cable 14 may be any desired amount, it is preferably above the audio range and below the radio frequency range. In addition, the frequency of the signal may be effective to regulate the speed of the automatically controlled vehicles so as to cause all controlled vehicles to travel at a uniform predetermined command speed.

In order to detect the presence of any obstacles in the path of the controlled vehicle, each section or block 12 of the path may be equipped with at least one group 18 of pickups that are buried beneath the surface of the roadway 10. Each group 18 consists of a plurality of inductive pickup coils 20 that are sufficiently close to the control cable 14 to be located within the alternating electromagnetic field radiated therefrom. As a result, each of the pickup coils 20 will be loosely coupled to the control cable 14 and will have a voltage induced therein of the same frequency as the current in the control cable 14. The amplitude of the induced voltage is dependent upon the degree of coupling, the turns ratio, etc. However, since all of the pickups 20 are substantially identical, the voltage in each pickup 20 will be substantially identical. Thus, by connecting all of the pickup coils 20 in the group 18 in series and with the voltages in adjacent pairs of coils being opposed, the total voltage at the output 22 of the entire group 18 will normally be substantially zero.

The output 22 of the entire group 18 is connected to an amplifier 24 to increase the strength of any signals to a more useful level. To further increase the sensitivity of the system, a condenser 26 may be provided across the output 22 to tune the resonant frequency of the group 18 of pickups 20 to the frequency of the current in the control cable 14. More particularly, one side 28 of the output 22 is grounded, while the other side 30 is connected directly to the control grid 32 of a triode 34. The cathode 36 of the triode 34 is grounded by means of a biasing resistor 38 and condenser 40. The plate 42 of the triode 34 is coupled to the cathode 44 of a diode 46 by means of a condenser 48. The diode 46 is effective to rectify the output of the amplifier 24 and to charge a condenser 50 in proportion thereto. The charge on the condenser 50 may be dissipated through the resistors 52 and 54. The voltage across the condenser 50 is applied directly to the control grid 56 of a quick cut-off triode 58. Due to the drop across the cathode dropping resistor 60, this tube 58 is normally biased beyond cut-off and no plate current flows therethrough. Thus a relay 62 disposed in the plate circuit will be de-energized and the contacts 64 will be open. Thus the lamp 66 will remain extinguished and not produce any indication.

In the event a vehicle or an obstacle is in proximity to one or more of the pickup coils 20, the coupling will vary and cause the balance of induced voltages to be disturbed. As a result, there will be a voltage present at the output 22. This will be amplified by the triode 34 and rectified by the diode 46. As a result, the condenser 50 will commence to be charged. If the unbalance persists for a sufficient period, as occurs with a stationary obstacle or a hazardously slow moving vehicle, the charge on the condenser 50 will accumulate to the point where the tube 58 will no longer be biased beyond cut-off but instead will commence conducting. When this occurs the relay 62 will be energized and the contacts 64 closed. Thus the lamp 66 will indicate the presence of a hazardous obstacle in the section 12. It should be understood that the lamp 66 may be supplemented by additional indicating means or means for automatically controlling the approaching vehicle to prevent an accident such as that disclosed and claimed in United States Patent No. 3,043,952, issued July 10, 1962, and assigned to the assignee of the present invention.

It should be noted that the spacing between and/or balancing of the induced voltages in the pickups 20 should be carefully arranged so that any obstacles will cause an unbalance in the group 18 of pickups 20 and it will be impossible for an obstacle to be located in the section or block 12 without providing an indication.

If a more comprehensive obstacle detection system is desirable, the embodiment of FIGURE 2 may be employed. In this system, two separate and independent groups 68 and 70 of pickups are provided in the roadway 10 in proximity to the control cable 14 so as to be disposed in an electromagnetic field and loosely coupled to the cable 14. Each group 68 and 70 consists of a plurality of substantially identical inductance pickup coils 72 that are buried beneath the surface of the roadway so as to have a voltage induced therein with a frequency equal to that in the control cable 14. The coils 72 in each group 68 and 70 are interspersed between the coils in the other group so that a vehicle or obstacle will not be able to simultaneously affect an even number of coils in both groups. The coils are connected in series, although they may be in parallel, with half of the coils 72 arranged so that the voltages induced therein will oppose the voltages induced in the other half. As a result, there will normally be no voltage present at the outputs 74 or 76 of either group 68 or 70 and it will be impossible for a vehicle to simultaneously affect an even number of pickups in both groups. The output 74 of the first group 68 includes a condenser 78 to tune the group 68 to the frequency of the current in the control cable 14 and is connected directly to the control grid 80 of a triode 82 that is effective to amplify any signals present at the output 74. The plate 84 of the triode 82 is, in turn, capacitively coupled to a diode 86 effective to rectify the output of triode 82 and charge a condenser 88 in response thereto.

The output 76 of the second group 70 is similar to the output 74 of the first group 68 in that it includes a tuning condenser 90 and is connected to the control grid 92 of a triode 94. The plate 96 of this triode 94 is, in turn, connected to a diode 98 which will rectify the output of triode 94 and charge a condenser 100 in response thereto.

The two condensers 88 and 100 are connected in series so that the voltages thereon will be added together. The total voltage is then applied directly to the control grid 102 of a quick cut-off tube 104. Since there will normally be no signal in either triode 82 or 94, there will normally be no potential on the condensers 88 and 100 and the triode 104 will be biased beyond cut-off as a result of the voltage drop across the voltage dividing resistors 106. However, if there is a signal in either of the tubes 82 or 94 one of the condensers 88 or 100 will have an adequate voltage thereon to bias the tube 104 into conduction. The plate 108 of the tube 104 is connected to a relay 109 that is effective to open and close the contacts 110 in the power circuit of an indicator lamp 112. Thus whenever a slow moving or stationary vehicle is in the proximity of a pickup 72, one or both of the condensers 88 or 100 will be charged and thus bias the tube 104 into conduction and light the warning lamp 112.

In the event it is desirable to indicate the presence of only stalled or slowly moving vehicles and not the presence of vehicles moving at command speed, an additional circuit 114 may be provided which is interconnected with the input of one of the diodes 98. The signal at this point will contain no D.C. components but will consist entirely of a "ripple" voltage having a frequency equal to the rate at which the vehicle is passing over the pickup coils 72. This ripple is capactively coupled to the grid 116 of an amplifying triode 118. The plate 120 of the triode 118 is, in turn, capactively coupled to a diode 121 which is effective to charge a condenser 122 through a resistor 124. The time constant for this R-C circuit is designed to cause a negative charge on the condenser 122 to build up to an amount just equal the total charge on the two condensers 88 and 100 when the speed of the vehicle is equal to the command speed. As a result, when a vehicle is traveling at command speed, the voltages across the condensers 88 and 100 will be balanced by the voltage on the condenser 122. Thus the tube 104 will remain biased beyond cut-off and no indication will be provided.

If it is desirable to also indicate the presence of a vehicle traveling at greater than command speed, a triode 126 may be provided which has the grid 128 potential determined by the voltage across the condenser 122. Normally, the tube 126 will be conducting and the relay 130 will be energized to maintain the contacts 132 open, thus preventing any indications of a high speed vehicle. However, if the frequency of the ripple is greater than for command speed, the charge on the condenser 122 will be sufficiently negative to cut off the tube 126. This will de-energize the relay 130 and close the contacts 132 and thus produce an indication of a speeding vehicle.

It is to be understood that, although the invention has been described with specific reference to particular embodiments thereof, it is not to be so limited since changes and alterations therein may be made which are within the full intended scope of this invention as defined by the appended claims.

What is claimed is:

1. Means for detecting the presence of an obstacle on a roadway having a tranmission line comprising, a pair of pickups disposed in said roadway and coupled to said transmission line to have normally equal and opposite signals transferred thereto from said line, said signals being individually variable due to the presence of an obstacle on the roadway in proximity to the respective pickups, first means differentially connected to said pickups and responsive to the difference between said signals, said first means having no output whenever said signals are equal but having an output whenever said signals differ substantially for more than some predetermined time interval, and second means differentially connected to said pickups and responsive to the difference between said signals to produce an output when the time spacing between the occurrence of the variations in said signals is less than some predetermined amount.

2. Means for detecting the presence of an obstacle on a roadway having a transmission line therein that radiates an electromagnetic field therefrom, said means comprising a pair of inductive coils that are disposed in said roadway and in said field to be inductively coupled to said transmission line and have signals induced therein, the coupling for said coils being such that said signals will normally be balanced but will be affected by the presence of an obstacle on said roadway to cause said signals to become unbalanced, amplifier means having an input connected with said coils and responsive to the difference between said signals, said amplifier means having no output whenever said signals are balanced but having an output whenever said signals differ by more than some predetermined amount, capacitance means connected to said amplifier means and adapted to integrate said output, and voltage responsive means connected to said capacitance means and adapted to produce an indication when the charge on said capacitance means exceeds a predetermined amount.

3. Means for detecting the presence of an object traveling on a roadway at greater than some predetermined speed comprising, a series of inductive coils longitudinally disposed at equal intervals along said roadway, each of said coils being effective to produce an output signal whenever an object passes thereover, first circuit means connected to at least a pair of said coils to produce a time varying signal with a frequency related to the rate at which said object passes over said coils, a condenser connected to said first circuit means to acquire a charge that is a function of said frequency, signal comparison means connected to said condenser and responsive to the charge thereon to produce an output signal whenever the frequency of said time varying signal is above some predetermined amount.

4. Means for detecting the presence of an obstacle on a roadway having a transmission line that radiates an electromagnetic field therefrom, said means comprising a plurality of inductive coils longitudinally spaced at equal intervals along said roadway and in said field whereby each of said coils is inductively coupled to said transmission line so as to have a signal induced therein, the coupling between said coils and said transmission line being such that the signals in said coils will normally be balanced against each other but will be altered by the presence of an obstacle adjacent a coil so as to produce an output signal, first circuit means connected to said coils and including a first condenser, said first condenser being connected to receive said output signal and acquire a charge proportional thereto whenever said signals are not balanced, second circuit means connected to said coils and including a second condenser, said second circuit means being responsive to the signals in each of said coils to produce a time varying output signal having a frequency related to the rate at which an object passes over said coils, said second condenser being connected to receive said time varying output signal and to acquire a charge which is a function of said frequency, differential means connected to said first and second condensers to compare the charges thereon and to produce an output signal whenever said charges are unequal.

5. In a system for detecting the presence of an obstacle on a roadway, a plurality of pickups disposed in said roadway and responsive to the presence of an object on the roadway to thereby produce signals whenever such an object is in proximity to said pickups, first means connected to said plurality of pickups adapted to receive at least some of said signals and effective to produce a first output signal when an obstacle is present on the roadway, second means coupled to said plurality of pickups adapted to receive at least some of said signals and effective to produce a second output signal having a magnitude that is directly related to the frequency of occurrence of the signals from said pickups, and indicating means connected to said first and second means and effective to produce an indication when the difference between said first and second output signals exceeds a predetermined amount.

6. In a system for detecting objects on a roadway, means for establishing a low-frequency field over a portion of said roadway, a plurality of pickup coils positioned in said portion to have current induced therein from said field, a first pair of said coils being connected in opposition so that an electrical output is produced when an object disturbs the field adjacent one of said first pair, a second pair of said coils interspaced with said first pair and connected in opposition so that an electrical output is produced when an object disturbs the field adjacent one of said second pair, a first translating circuit connected to said first and second pair to receive said electrical outputs and adapted to produce a first output voltage related in magnitude to the time interval which either of said electrical outputs persists, a second translating circuit connected to said first pair to receive said electrical output and adapted to produce a second output voltage related in magnitude to the rate of repetition of said electrical outputs, a first indicator connected to said first and second translating circuits to receive said first and second output voltages in opposition and adapted to produce a first indication when said first output voltage exceeds said second output voltage by a predetermined magnitude, and a second indicator connected to said second translating circuit to receive said second output voltage and adapted to produce a second indication when said second output voltage exceeds a predetermined magnitude.

7. In a system for detecting objects on a roadway, a plurality of pickup devices positioned along said roadway, a first pair of said pickup devices being connected in opposition so that an electrical output is produced when an object is adjacent one of said first pair, a second pair of said pickup devices interspaced with said first pair and connected in oppostion so that an electrical output is produced when an object is adjacent one of said second pair, a first translating circuit connected to said first and second pair to receive said electrical outputs and adapted to produce a first output voltage related in magnitude to the time interval which either of said electrical outputs persists, a second translating circuit connected to said first pair to receive said electrical output and adapted to produce a second output voltage related in magnitude to the rate of repetition of said electrical outputs, a first indicator connected to said first and second translating circuits to receive said first and second output voltages in opposition and adapted to produce a first indication when said first output voltage exceeds said second output voltage by a predetermined magnitude, and a second indicator connected to said second translating circuit to receive said second output voltage and adapted to produce a second indication when said second output voltage exceeds a predetermined magnitude.

8. In a system for detecting objects on a roadway, a plurality of pickups positioned along said roadway, a first pair of said pickups being connected in opposition so that an electrical output is produced when an object is adjacent one of said first pair, a second pair of said pickups interspaced with said first pair and connected in opposition so that an electrical output is produced when an object is adjacent one of said second pair, a first translating circuit connected to said first and second pair to receive said electrical outputs and adapted to produce a first output voltage related in magnitude to the time interval which either of said electrical outputs persists, a second translating circuit connected to said first pair to receive said electrical output and adapted to produce a second output voltage related in magnitude to the rate of repetition of said electrical outputs, and an indicator connected to said first and second translating circuits to receive said first and second output voltages in opposition and adapted to produce an indication when said first output voltage exceeds said second output voltage by a predetermined magnitude.

(References on following page)

References Cited in the file of this patent

UNITED STATES PATENTS

| | | |
|---|---|---|
| 2,201,145 | Barker | May 21, 1940 |
| 2,355,395 | Rubinstein | Aug. 8, 1944 |
| 2,435,996 | Baird | Feb. 17, 1948 |
| 2,532,231 | Jarvis | Nov. 28, 1950 |
| 2,537,298 | Baughman | Jan. 9, 1951 |
| 2,580,155 | Brannen | Dec. 25, 1951 |
| 2,713,679 | Ewertz | July 19, 1955 |
| 2,730,245 | Auld | Jan. 10, 1956 |
| 2,877,454 | Zedler et al. | Mar. 10, 1959 |

FOREIGN PATENTS

| | | |
|---|---|---|
| 704,476 | Great Britain | Feb. 24, 1954 |